United States Patent [19]

Scholl et al.

[11] Patent Number: 4,528,153

[45] Date of Patent: Jul. 9, 1985

[54] PROCESS FOR PRODUCING MOLDED PARTICULATE ARTICLES UTILIZING A SELF-RELEASING BINDER BASED ON A SULFONIC ACID MODIFIED ISOCYANATE

[75] Inventors: Hans-Joachim Scholl; Hanns I. Sachs, both of Cologne; Gert Jabs, Odenthal; Günther Loew, Leichlingen, all of Fed. Rep. of Germany

[73] Assignee: Bayer Aktiengesellschaft, Leverkusen, Fed. Rep. of Germany

[21] Appl. No.: 422,407

[22] Filed: Sep. 20, 1982

Related U.S. Application Data

[62] Division of Ser. No. 150,495, May 16, 1980, Pat. No. 4,478,738.

[30] Foreign Application Priority Data

May 29, 1979 [DE] Fed. Rep. of Germany ....... 2921689

[51] Int. Cl.³ .............................................. B29J 5/02
[52] U.S. Cl. .................................... 264/109; 264/122; 524/745; 528/59
[58] Field of Search ................ 264/109, 122; 524/745; 528/59

[56] References Cited

U.S. PATENT DOCUMENTS 3,870,665  3/1975  Dieht et al. .
3,898,197  8/1975  Guise et al. ........................... 528/59
4,013,701  3/1977  Jabs et al. ....................... 521/162 X
4,100,328  7/1978  Gallagher ........................... 428/407
4,257,995  3/1981  McLaughlin et al. .............. 264/122
4,257,996  3/1981  Farrissey, Jr. et al. ............. 264/122
4,258,169  3/1981  Prather et al. .................. 264/122 X
4,288,562  9/1981  Kresta et al. .................... 528/72 X
4,376,088  3/1983  Prather .............................. 264/109

FOREIGN PATENT DOCUMENTS 793937  9/1968  Canada .
1492507  5/1969  Fed. Rep. of Germany .
1653177  11/1970  Fed. Rep. of Germany .
1653178  11/1970  Fed. Rep. of Germany .
2711958  9/1978  Fed. Rep. of Germany .
1387454  3/1975  United Kingdom .

Primary Examiner—Philip Anderson
Attorney, Agent, or Firm—Gene Harsh; Joseph C. Gil; Thomas W. Roy

[57] ABSTRACT

The present invention relates to a substantially anhydrous binder having a self-releasing effect for the production of pressed articles comprising:
(A) a polyisocyanate; and
(B) a sulfonic acid corresponding to the general formula:

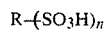

wherein
n represents an integer of 1 or 2;
R represents an aromatic hydrocarbon radical having from 6 to 14 carbon atoms, an aliphatic hydrocarbon radical having from 10 to 18 carbon atoms, a cycloaliphatic hydrocarbon radical having from 6 to 15 carbon atoms, an araliphatic hydrocarbon radical having from 7 to 15 carbon atoms or an alkaromatic hydrocarbon radical having from 7 to 24 carbon atoms; and
the equivalent ratio of the components (A) and (B) is 100:0.5 to 100:20.

The invention is also directed to the use of such binders in the production of shaped articles by the hot pressing of a wide variety of organic and/or inorganic materials.

12 Claims, No Drawings

PROCESS FOR PRODUCING MOLDED PARTICULATE ARTICLES UTILIZING A SELF-RELEASING BINDER BASED ON A SULFONIC ACID MODIFIED ISOCYANATE

This application is a division of application Ser. No. 150,495, filed May 16, 1980 and now U.S. Pat. No. 4,478,738.

BACKGROUND OF THE INVENTION

The present invention relates to substantially anhydrous binders based on polyisocyanates which are modified by the addition of an organic sulfonic acid such that they have a self-releasing effect. The invention is also directed to the use of such binders in the production of shaped articles such as panels by the hot pressing of a wide variety of organic and/or inorganic materials such as substances containing lignocellulose.

Pressed materials such as chip boards, composite panels and other shaped articles are usually produced by hot pressing the inorganic or organic raw material such as a composition of wood shavings, wood fibers or another material containing lignocellulose, with binders such as aqueous dispersions or solutions of urea/formaldehyde or phenol/formaldehyde resins. It is also known to use isocyanates or isocyanate solutions as binders for pressed panels instead of formaldehyde resins (German Auslegeschrift No. 1,271,984; German Offenlegungsschriften Nos. 1,492,507; 1,653,177 and 2,109,686). The use of polyisocyanates as binders improves the stability and the moisture-resistance of the products and improves their mechanical properties. In addition, polyisocyanates have a wide range of processing advantages as binders as disclosed in German Offenlegungsschrift No. 2,109,686.

The large scale production of materials which are bonded with polyisocyanates, in particular materials containing lignocellulose such as chip boards, fiber boards or plywood is, however, impaired by the marked tackiness of the polyisocyanates. This tackiness, after the hot pressing treatment, causes the molded articles to adhere strongly to metal articles, in particular the steel or aluminum surfaces of the press. Such adherence thus makes it more difficult to remove the molded articles from the mold.

Previously proposed methods of solving this mold release problem suffer from significant disadvantages. Release agents which have been developed especially for isocyanates frequently have a good release action but, in industrial applications, they are neither reliable nor economical enough and, additionally, may cause faulty bonding or difficulties in coating during the subsequent processing of the plates.

It has been proposed in German Offenlegungsschrift No. 1,653,178 that, during the production of panels or shaped articles by the hot pressing of mixtures of materials containing lignocellulose and polyisocyanates, the surfaces of the press or pressing molds be treated with polyhydroxyl compounds such as glycerin, ethylene glycol or polyester and polyether polyols before the pressing operation. A disadvantage of this process is that a separate operation is required to apply this release agent and, in addition, a proportion of the polyisocyanate is consumed by the reaction with the release agent. According to German Offenlegungsschrift No. 2,325,926, another possible way of improving the release behavior of the shaped articles involves using as release agents those compounds which act as catalyst with isocyanates to form isocyanurate. However, a disadvantage of this approach is that the catalysts have a destabilizing effect on the isocyanate and thus prevent the formation of a suitable isocyanate binder.

An object of the present invention is to overcome the above-mentioned disadvantages in the production of shaped articles using polyisocyanates by providing binders based on isocyanates which may be stored and which ensure that the pressed articles may be removed from the mold without difficulty. It has surprisingly been found that this object may be achieved if the isocyanate is used in combination with an organic sulfonic acid.

DESCRIPTION OF THE INVENTION

The present invention relates to a substantially anhydrous binder for the production of pressed articles, optionally containing organic solvents, which has a self-releasing effect and is based on a polyisocyanate comprising:

(A) a polyisocyanate; and
(B) a sulfonic acid corresponding to the general formula:

$$R-(SO_3H)_n$$

wherein
n represents the integer 1 or 2, preferably 1; and
R represents an aromatic hydrocarbon radical having from 6 to 14 carbon atoms, an aliphatic hydrocarbon radical having from 10 to 18 carbon atoms, a cycloaliphatic hydrocarbon radical having from 6 to 15 carbon atoms, an araliphatic hydrocarbon radical having from 7 to 15 carbon atoms or an alkaromatic hydrocarbon radical having from 7 to 24 carbon atoms;

the equivalent ratio of components (A):(B) being from 100:0.5 to 100:20, preferably from 100:1 to 100:5.

Those sulfonic acids corresponding to the general formula wherein R represents an araliphatic hydrocarbon radical having from 7 to 15 carbon atoms or an alkaromatic hydrocarbon radical having from 7 to 24 carbon atoms are preferred.

Particularly preferred for the modification of the isocyanate component are those sulfonic acids corresponding to the above general formula wherein R represents an alkyl-substituted phenyl radical having a total of from 9 to 20 carbon atoms. It is, however, also possible to use as release agents those sulfonic acids corresponding to the above general formula wherein R also contains inert substituents such as halogen or nitro substituents.

Specific representatives of suitable sulfonic acids include, for example, decane sulfonic acid, octadecane sulfonic acid, benzene sulfonic acid, toluene sulfonic acid, naphthalene sulfonic acid, cyclohexane sulfonic acid and, in particular, aromatic monosulfonic acids of the type which may be obtained in known manner by the sulfonation of alkyl benzenes such as hexyl-benzene, dodecyl-benzene, octadecyl-benzene or mixtures thereof.

The present invention also relates to a process for the production of shaped articles by the hot pressing of an organic and/or inorganic material which is mixed and/or impregnated with a compound containing isocyanate groups as binder, using an agent to release the molded article from the surfaces of the pressing mold, the process being characterized in that the binder combinations of the present invention are used.

A process for the production of modified polyisocyanates has been disclosed in German Offenlegungsschrift No. 2,441,843 in which organic polyisocyanates are reacted in a molar ratio of from 100:0.1 to 100:50 with from 0.1 to 5% by weight water-containing organic sulfonic acid until from 50 to 100% of the carbon dioxide theoretically expected to be evolved as a result of the reaction of all the water with the isocyanate groups has been evolved. The polyisocyanates which have been modified in this way are used as isocyanate components in the production of hydrophilic polyurethane foams. There is not, however, any reference to the use of these modified polyisocyanates as binders in the production of molded articles. Moreover, according to German Offenlegungsschrift No. 2,441,843, while they are being modified, the polyisocyanates are reacted with sulfonic acids containing a considerable quantity of water which would be disadvantageous for the present invention as it would reduce the isocyanate content of the binder unnecessarily. Although adducts are formed between the isocyanate groups and the sulfonic acid groups which are not fully understood in the substantially anhydrous binder combinations according to the present invention, this process should be an essentially physical association in which the content of NCO groups (although possibly partly in masked form) remains unchanged. Elimination of carbon dioxide is not observed.

Suitable isocyanate components for the binder combinations according to the present invention include virtually any polyisocyanates, but preferably aliphatic, cycloaliphatic, araliphatic, aromatic and heterocyclic polyisocyanates which are liquid at room temperature, of the type described, for example, by W. Siefken in Justus Liebigs Annalen der Chemie, 562, pages 75 to 136. Examples of suitable isocyanate components include, for example, those polyisocyanates of the general formula:

$$Q(NCO)_n$$

wherein
n represents an integer of from 2 to 4, preferably 2; and
Q represents an aliphatic hydrocarbon radical having from 2 to 18, preferably from 6 to 10 carbon atoms, a cycloaliphatic hydrocarbon radical having from 4 to 15, preferably from 5 to 10 carbon atoms, an aromatic hydrocarbon radical having from 6 to 15, preferably from 6 to 13 carbon atoms, or an araliphatic hydrocarbon radical having from 8 to 15, preferably from 8 to 13 carbon atoms.

Examples of such polyisocyanates include: ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate as well as mixtures of these isomers; 1-isocyanato-3,3,5-trimethyl-5-isocyanatomethylcyclohexane (German Auslegeschrift No. 1,202,785, U.S. Pat. No. 3,401,190); 2,4- and 2,6-hexahydrotolylene diisocyanate as well as mixtures of these isomers; hexahydro-1,3- and/or -1,4-phenylene diisocyanate; perhydro-2,4'- and/or 4,4'-diphenylmethane-diisocyanate; 1,3- and 1,4-phenylene diisocyanate; 2,4- and 2,6-tolylene diisocyanate as well as mixtures of these isomers; diphenylmethane-2,4'- and/or -4,4'-diisocyanate and naphthylene-1,5-diisocyanate.

Examples of other suitable polyisocyanates include: triphenylmethane-4,4',4"-triisocyanate; polyphenyl polymethylene polyisocyanates of the type obtained by aniline/formaldehyde condensation followed by phosgenation and described, for example, in British Pat. Nos. 874,430 and 848,671; m- and p-isocyanato-phenyl sulfonyl-isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Pat. No. 1,092,007 (U.S. Pat. No. 3,152,162) as well as in German Offenlegungsschriften Nos. 2,504,400; 2,537,685 and 2,552,350 and norbornane diisocyanates according to U.S. Pat. No. 3,492,330. Additional suitable polyisocyanates include those containing allophanate groups of the type described, for example, in British Pat. No. 994,890, Belgian Pat. No. 761,626 and Netherlands patent application No. 7,102,524; polyisocyanates containing isocyanurate groups of the type described, for example, in U.S. Pat. No. 3,001,973, in German Pat. Nos. 1,022,789; 1,222,067 and 1,027,394 as well as in German Offenlegungsschriften Nos. 1,929,034 and 2,004,048; polyisocyanates containing urethane groups of the type described, for example, in Belgian Pat. No. 752,261 or in U.S. Pat. Nos. 3,394,164 and 3,644,457; polyisocyanates containing acylated urea groups according to German Pat. No. 1,230,778; polyisocyanates containing biuret groups of the type described for example, in U.S. Pat. Nos. 3,124,605 and 3,201,372 as well as in British Pat. No. 889,050; polyisocyanates produced by telomerization reactions of the type described, for example, in U.S. Pat. No. 3,654,106; polyisocyanates containing ester groups of the type described, for example, in British Pat. Nos. 965,474 and 1,072,956, in U.S. Pat. No. 3,567,763 and in German Pat. No. 1,231,688; reaction products of the above-mentioned diisocyanates with acetals according to German Pat. No. 1,072,385 and polyisocyanates containing polymeric fatty acid esters according to U.S. Pat. No. 3,455,883.

It is also possible to use the distillation residues which contain isocyanate groups produced during the generally known production of isocyanates, optionally dissolved in one or more of the above-mentioned polyisocyanates. Moreover, it is possible to use mixtures of the above-mentioned polyisocyanates.

Examples of particularly preferred polyisocyanates include: 2,4- and 2,6-tolylene diisocyanate as well as mixtures of these isomers ("TDI"); polyphenyl polymethylene polyisocyanates of the type produced by aniline/formaldehyde condensation with subsequent phosgenation ("crude MDI"); and polyisocyanates containing carbodiimide groups, urethane groups, allophanate groups, isocyanurate groups, urea groups or biuret groups ("modified polyisocyanates"), particularly those modified polyisocyanates which are derived from 2,4- and/or 2,6-tolylene diisocyanate and from 4,4'- and/or 2,4'-diphenylmethane diisocyanate.

Suitable isocyanate components also include prepolymers containing terminal NCO groups having an average molecular weight of from about 300 to 2000 of the type obtained in known manner by the reaction of higher molecular weight and/or lower molecular weight polyols with an excess of polyisocyanate. Suitable higher molecular weight polyols include, in particular, compounds containing from 2 to 8 hydroxyl groups, particularly those having a molecular weight of from 400 to 10,000, preferably from 800 to 5,000 such as polyesters, polyethers, polythioethers, polyacetals, polycarbonates and polyester amides containing at least two, generally from 2 to 8, preferably from 2 to 4, hydroxyl groups of the type which are known for the production of noncellular and of cellular polyurethanes.

Suitable polyesters containing hydroxyl groups include, for example, reaction products of polyhydric, preferably dihydric, and optionally also trihydric alcohols with polybasic, preferably dibasic, carboxylic acids. The corresponding polycarboxylic acid anhydrides or corresponding polycarboxylic acid esters of lower alcohols or mixtures thereof may be used for the production of the polyesters instead of the free polycarboxylic acids. The polycarboxylic acids may be aliphatic, cycloaliphatic, aromatic and/or heterocyclic and may optionally be substituted, for example by halogen atoms, and/or may be unsaturated.

Examples of suitable carboxylic acids and derivatives thereof for the preparation of the polyesters include: succinic acid; adipic acid, suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid; terephthalic acid dimethyl ester and terephthalic acid-bis-glycol ester. Examples of suitable polyhydric alcohols include: ethylene glycol; propylene glycol-(1,2) and -(1,3); butylene glycol-(1,4) and -(2,3); hexane diol-(1,6); octane diol-(1,8); neopentyl glycol; 1,4-bis-hydroxymethyl cyclohexane; 2-methyl-1,3-propane diol; glycerin; trimethylol propane; hexane triol-(1,2,6); butane triol-(1,2,4); trimethylol ethane; pentaerythritol; quinitol; mannitol; sorbitol; formitol; methyl glycoside; diethylene glycol; triethylene glycol; tetraethylene glycol and higher polyethylene glycols; dipropylene glycol and higher polypropylene glycols as well as dibutylene glycol and higher polybutylene glycols. The polyesters may contain a proportion of terminal carboxyl groups. Polyesters of lactones, for example ε-caprolactone, or of hydroxycarboxylic acids, for example ω-hydroxycaproic acid, may also be used.

Polyethers containing at least two, generally from 2 to 8, preferably 2 or 3 hydroxyl groups which may be used according to the invention include those known compounds which may be prepared, for example, by self-polymerization of epoxides such as ethylene oxide, propylene oxide, butylene oxide, tetrahydrofuran, styrene oxide or epichlorohydrin, for example in the presence of Lewis catalysts such as $BF_3$; or by addition of these epoxides, preferably ethylene oxide and propylene oxide, optionally in mixture or in succession, to starting components containing reactive hydrogen atoms such as water, ammonia, alcohols or amines. Examples of such starting components include: ethylene glycol; propylene glycol-(1,3) or -(1,2); trimethylol propane; glycerin; sorbitol; 4,4'-dihydroxydiphenylpropane; aniline; ethanolamine or ethylene diamine. Sucrose polyethers of the type described, for example, in German Auslegeschriften Nos. 1,176,358 and 1,064,938 as well as polyethers which are started on formitol or formose (German Offenlegungsschriften Nos. 2,639,083 or 2,737,951) may also be used according to the invention. In many cases, it is preferable to use those polyethers which contain predominantly (i.e. up to 90% by weight, based on all OH groups present in the polyether) primary OH groups. Polybutadienes containing OH groups may also be used.

The polythioethers include, in particular, the self-condensation products of thiodiglycol and/or the condensation products of thiodiglycol with other glycols, dicarboxylic acids, formaldehyde, amino carboxylic acids or amino alcohols. Depending on the co-components, the products are, for example, polythio mixed ethers, polythio ether esters or polythio ether ester amides.

Suitable polyacetals include, for example, the compounds which may be produced from the reaction of glycols such as diethylene glycol, triethylene glycol, 4,4'-diethoxy diphenyldimethyl methane and hexane diol with formaldehyde. Polyacetals suitable for the present invention may also be produced by polymerization of cyclic acetals such as trioxane (German Offenlegungsschrift No. 1,694,128).

Suitable polycarbonates containing hydroxyl groups include those known compounds which may be prepared, for example, by reaction of diols such as propane diol-(1,3); butane diol-(1,4) and/or hexane diol-(1,6); diethylene glycol; triethylene glycol; tetraethylene glycol or thiodiglycol, with diaryl carbonates such as diphenyl carbonate, or with phosgene (German Auslegeschriften Nos. 1,694,080; 1,915,908 and 2,221,751 and German Offenlegungsschrift No. 2,605,024).

The polyester amides or polyamides include, for example, the predominantly linear condensates obtained from polybasic saturated or unsaturated carboxylic acids and anhydrides thereof and polyfunctional saturated or unsaturated amino alcohols, diamines, higher polyamines and mixtures thereof.

Polyhydroxyl compounds already containing urethane or urea groups as well as optionally modified natural polyols such as castor oil, or carbohydrates such as starch may also be used. Addition products of alkylene oxides with phenol/formaldehyde resins or with urea/formaldehyde resins may also be used.

Suitable lower molecular weight polyols (i.e. having a molecular weight of from 62 to 400) include, for example, the compounds listed above as starting components for the production of higher molecular polyols.

As mentioned above, polyphenyl polymethylene polyisocyanates are preferably used as the isocyanate component of the binder. It is particularly advantageous (see German Offenlegungsschrift No. 2,711,598) to use as the isocyanate component, the phosgenation product of the undistilled bottom fraction of the type produced during the removal of from 25 to 90% by weight, preferably from 30 to 85% by weight, of 2,2'-, 2,4'-and/or 4,4'-diamino diphenylmethane from an aniline/formaldehyde condensate, or to use an undistilled bottom fraction of the type obtained during the removal of from 25 to 90% by weight, preferably from 30 to 85% by weight, of 2,2'-, 2,4'- and/or 4,4'-diisocyanato-diphenylmethane from the crude phosgenation product of an aniline/formaldehyde condensate. These preferred polyisocyanates contain from 35 to 70% by weight, preferably from 45 to 60% by weight, of diisocyanato-diphenylmethanes, the content of 2,4'-diisocyanato-diphenylmethane amounting to from 1 to 8% by weight, preferably from 2 to 5% by weight, and the content of 2,2'-diisocyanato-diphenylmethane amounting to from 0 to 2% by weight. These preferred polyisocyanates have viscosities at 25° C. of from 50 to 600 mPas, preferably from 200 to 500 mPas, and an NCO content of from 28 to 32% by weight.

Suitable bottom fractions can be obtained, for example, during the removal of from 45 to 90% by weight, preferably from 55 to 85% by weight, of 4,4'-diisocyanato-diphenylmethane from a crude diphenylmethane diisocyanate containing more than 85% by weight, preferably more than 90% by weight, of 4,4'-diisocyanato-diphenylmethane. A crude diphenylmethane diisocyanate of this type may be obtained, for example, by the process in German Offenlegungsschrift No. 2,356,828.

Another method involves distilling from 25 to 80% by weight, preferably from 30 to 60% by weight, of 2,4'-diisocyanato-diphenylmethane and optionally 4,4'- or 2,2'-diisocyanato-diphenylmethane from a crude phosgenation product containing from 60 to 90% by weight, preferably from 65 to 75% by weight, of diisocyanato-diphenylmethane isomers which contain from 20 to 60% by weight, preferably from 30 to 40% by weight, of 2,4'-isomers. In each case, distillation may be carried out in such a way that the residue has the desired composition.

However, it is also possible (and in many cases, also simpler in practice) to obtain the desired isomer or oligomer composition of the polyphenyl polymethylene polyisocyanate by blending various bottom fractions.

Examples of suitable raw materials containing lignocellulose which may be bound with the binders according to the invention include: wood, bark, cork, bagasse, straw, flax, bamboo, alfalfa, rice husks, sisal fibers and coconut fibers. However, pressed articles may also be produced according to the invention from other organic (for example, plastic scraps of various types) and/or inorganic raw materials (for example, expanded mica or silicate beads). In this case, the material may be present in the form of granules, shavings, fibers, beads or dust and may have a moisture content of, for example, from 0 to 35% by weight.

It is possible, but less preferable, to apply the two components in the binder combination (polyisocyanate and sulfonic acid) separately to the material to be bonded, the components optionally being dissolved in an inert organic solvent. It is preferable to modify the polyisocyanate with the sulfonic acid in a separate operation. In this case, the sulfonic acid is used in a virtually anhydrous form (preferably having a water content of less than 0.1% by weight). From 0.5 to 20 equivalents, preferably from 1 to 5 equivalents, of sulfonic acid groups are used per 100 equivalents of isocyanate groups. The components may be combined, for example, at from 10° to 90° C., preferably from 20° to 60° C., optionally in the presence of an inert organic solvent such as hydrocarbon fractions. The resulting binder combinations, which has a self-releasing effect, are stable in storage and may be used when required in the process of the invention.

The organic and/or inorganic material to be bonded is reacted with the binder in a quantity of from about 0.5 to 20% by weight, preferably from 2 to 12% by weight, based on the total mass of the molded article, and is pressed into panels or three-dimensional, shaped articles, generally under the influence of heat and pressure (for example, from 70° to 250° C. and from 1 to 150 bar).

Similarly, multilayered panels or shaped articles may be produced from veneers, paper or fabrics by treating the layers with the binder in the manner described above and then pressing them generally at elevated temperatures and elevated pressure. Preferably temperatures of from 100° to 250° C., more preferably from 130° to 200° C., are maintained. The initial pressure is preferably from 5 to 150 bar and the pressure generally falls towards 0 in the course of the pressing operation.

According to the present invention, the polyisocyanates which have been modified with sulfonic acids may also be used as binders in combination with the polyhydroxyl compounds described above in an NCO:OH ratio of from 1.2:1 to 10:1, preferably from 1.5:1 to 1:1. In this case, it is possible to use the two components separately or as a reactive mixture. These combinations of polyisocyanate and polyhydroxyl compounds are of practical importance as binders, for example in the bonding of granulated cork. It is also possible to add known blowing agents in a quantity of from about 0.5 to 30% by weight, based on binder or impregnation material. Additionally, other additives which influence the formation of foam during the chemical reaction between polyisocyanates, material containing lignocellulose and optionally polyhydroxyl compounds such as stabilizers, catalysts and other known additives may be used in a quantity of from 0.05 to 10% by weight, based on binder or impregnation agent.

The binders of the invention may also be combined with the aqueous solutions of condensation products of formaldehyde with urea and/or melamine and/or phenol which have been used predominantly up until now in the timber industry. It is also possible to use the binders of the invention with other less common binders and impregnation agents such as those based on polyvinyl acetate or other plastic latices, sulfite waste liquor or tannin. A mixing ratio of the binders according to the present invention with these additional binders is generally maintained at from 1:20 to 20:1, preferably from 1:5 to 5:1. The polyisocyanate mixtures and the additional binders may be used either separately or in admixture.

These combinations are particularly advantageous in the production of multilayered panels having specialized properties. For example, the outer layers may be reacted with polyisocyanate mixtures in accordance with the present invention (alone or together with conventional adhesives) and one or more internal layers with conventional adhesives (alone or together with the polyisocyanate mixtures) and then pressed together.

The panels or shaped articles based on raw materials containing lignocellulose produced using the process of the invention are particularly suitable for use in the construction industry due to their excellent mechanical properties as well as their desirable behavior during changes in humidity. In order to impart to the panels or shaped articles resistance to attack by fungus or insects or to the effects of fire, it is possible to add to the binders conventional organic or inorganic protectants in pure form or in solution form in a quantity of from about 0.05 to 30% by weight, preferably from 0.5 to 20% by weight, based on raw materials containing lignocellulose. Suitable solvents include water or organic solvents such as residual oils from petroleum refining, chlorinated hydrocarbons etc. Bonding quality is not generally impaired by the solvents. In contrast to panels which have been bonded with phenol/formaldehyde resin, neither efflorescence of salt nor "bleeding" occur with the materials produced according to the invention.

The mixtures used according to the invention provide substantial advantages over conventional binders based on phenol/formaldehyde or urea/formaldehyde resins during the production of chip boards both with respect to mechanical properties and to processing. Thus, in the case of wood chip boards, it is possible either to achieve a flexural strength which is increased by up to 50% with the same quantity of binder, in the case of phenol/formaldehyde or urea/formaldehyde resins (in addition to an improvement in other mechanical properties) or to achieve the same mechanical property spectrum with a binder concentration which is reduced by from 25 to 70%. These optimum material properties are achieved, in particular, if a polyphenyl polymethylene polyisocyanate having the viscosity and isomer distribution described above are used as binders.

It does not matter whether the polyisocyanate mixture has been produced by distilling off 2,2'-and/or 4,4'-diisocyanato-diphenylmethane from crude diphenylmethane diisocyanate or similarly by separating pure diamino-diphenylmethane from crude diamino-diphenylmethane and then phosgenating the undistilled bottom fraction of polyarylamines thus obtained.

If the polyisocyanate contains more than 75% by weight of diisocyanato-diphenylmethanes, the physical properties of the chip board are impaired considerably. On the other hand, if the content of diisocyanato-diphenylmethane falls to below 35% by weight, the binder generally becomes too viscous at room temperature and may no longer be mixed uniformly with the raw material containing lignocellulose on conventional bonding machines.

The following Examples illustrate the present invention. Numerical quantities are to be interpreted as parts by weight or percentages by weight unless otherwise indicated.

The following polyisocyanate components have been used in the Examples:

A 1: Sufficient diisocyanato-diphenylmethane is distilled from the crude phosgenation product of an aniline/formaldehyde condensate for the distillation residue to have a viscosity of 100 cP at 25° C. (2-nuclear content: 59.7%; 3-nuclear content: 21.3%; content of higher nuclear polyisocyanates: 19.0%).

A 2: Polyisocyanates were produced similarly to A 1 but having a viscosity of 200 cP at 25° C. (2-nuclear content: 44.3%; 3-nuclear content: 23.5%; content of higher nuclear polyisocyanates: 32.2%).

A 3: Polyisocyanates were produced similarly to A 1 but having a viscosity of 400 cP at 25° C. (2-nuclear content: 45.1%; 3-nuclear content: 22.3%; content of higher nuclear polyisocyanates: 32.6%).

A 4: Polyisocyanates were produced similarly to A 1 but having a viscosity of 300 cP at 25° C. (2-nuclear content: 56.8%; 3-nuclear content: 27.6%; content of higher nuclear polyisocyanates: 15.6%).

The commercial alkyl benzene sulfonic acid, MARLON ®AS$_3$ (commercial product made by the firm Chemische Werke Hüls AG) was used as sulfonic acid in the Examples.

Component distribution of the sulfonic acid:
$C_{10}$ about 5% by weight
$C_{11}$ about 45–50% by weight
$C_{12}$ about 35–40% by weight
$C_{13}$ about 10–15% by weight
$C_{14}$ about 1% by weight.

EXAMPLES

Example 1

900 g of polyisocyanate A 2 are placed in a reaction vessel. The sulfonic acid is added dropwise over a period of 30 minutes at from 20° to 30° C. with stirring. The mixture is stirred for a further hour at 50° C. and a product having an NCO content of 28.1% and a viscosity of 600 cP/25° C. is obtained. The products shown in Table I below were similarly obtained:

TABLE I

| Example | Isocyanate (g) | Sulfonic acid (g) | Temp. (°C.) | Subsequent stirring | NCO % by weight | Viscosity (cP/25° C.) |
|---|---|---|---|---|---|---|
| 1 | 900 A 2 | 100 | 20–30 | 1 hour 50° C. | 28.1 | 600 |
| 2 | 950 A 4 | 50 | 20–30 | 1 hour 50° C. | 28.5 | 800 |
| 3 | 970 A 2 | 30 | 20–30 | 1 hour 25° C. | 29.1 | 300 |
| 4 | 900 A 2 | 100 | 80 | 1 hour 80° C. | 28.0 | 700 |
| 5 | 900 A 1 | 100 | 20–30 | 1 hour 50° C. | 28.2 | 400 |
| 6 | 950 A 2 | 50 | 50 | 1 hour 50° C. | 28.6 | 600 |
| 7 | 900 A 4 | 100 | 20–30 | 1 hour 50° C. | 27.0 | 1500 |

Example 8

3000 parts of an industrially produced mixture of coniferous/deciduous timber chips having a moisture content of 10% are mixed with 164 parts of the product according to Example 1. A molding is formed from the material on a steel sheet which is pressed for two minutes at a hot plate temperature of 170° C. and a starting pressure of 25 bar.

The chip board obtained releases itself from the sheet and the heating plate spontaneously and is completely equivalent in its mechanical properties to a chip board which has been produced using the same quantity of the unmodified isocyanate A 2.

Example 8A: Comparison

An alternative experiment was carried out to produce a chip board using the unmodified isocyanate A 2 by the process described in Example 8. In contrast, the sheets adhered so strongly to the chip board that the sheets could not be removed without damaging the chip board.

Example 9

12,000 parts of wood chips having a 9% moisture content are wetted with 440 parts of the product from Example 2. A transporting pallet is produced from the material under pressure and heat in a refined steel mold and may be removed easily once the press has been opened. The product is far superior in mechanical properties to a pallet which is bonded using a conventional urea/formaldehyde resin.

Example 10

3000 parts of comminuted wheat straw are reacted with a mixture of 60 parts of the product from Example 3, 480 parts of a 65% aqueous urea/formaldehyde resin (1:1.4) and 20 parts of a 1% solution in white spirit of the insecticide hexachloroepoxyoctahydroendo-exodimethanonaphtalene. A molding is formed from the material on an aluminum sheet by air separation and is cured at 200° C. hot plate temperature under pressure.

A chip board is obtained which is generally equal to a conventional commercial wooden chip board but is superior in its flexural and edge strength. The panel releases itself from the sheet and heating plate spontaneously after the pressing operation and is protected from damage by insects.

Example 11

1000 parts of surface layer chips made of coniferous wood having a moisture content of 20% are wetted with 58 parts of the product from Example 4. In addition, 2000 parts of middle layer chips which have been treated with 160 parts of water and 17 parts of potassium hydrogen fluoride are wetted with 110 parts of the unmodified polyisocyanate A 3. A three-layered molding is formed from the materials on a steel screen and is then cured at 130° C. under pressure. The panel obtained releases itself readily from the steel sheet and the heating plate and exhibits durable resistance to the attack of wood-destroying fungi in addition to excellent strength.

Example 12

Five beech veneers of 1 mm thickness having a moisture content of 7% are immersed in a mixture of 95 parts of the product according to Example 7 and five parts of N-methyl-pyrrolidone. After a short draining time, the veneers are positioned on top of each other in crisscross fashion between steel sheets not previously treated with release agent and cured at 140° C. under pressure. A weather-resistant, improved plywood board of high quality is obtained which releases itself from the sheets without difficulties after the pressing operation.

Example 13

3000 parts of expanded mica having a moisture content of 8% are wetted with 167 parts of the product according to Example 5. A molding is formed from it on an aluminum sheet and is pressed for 8 minutes at 150° C. A fireproof panel which readily releases itself from the sheet and heating plate after the pressing operation is obtained.

What is claimed is:

1. A process for producing molded articles comprising:
(A) introducing into a mold particulate organic and/or inorganic material from which pressed articles may be produced, the material being mixed and/or impregnated with a substantially anhydrous binder;
(B) hot pressing the material; and
(C) removing the material from the mold; wherein the binder comprises:
 (a) a polyisocyanate; and
 (b) a sulfonic acid corresponding to the general formula:

wherein
 n represents an integer of 1 or 2;
 R represents an aromatic hydrocarbon radical having from 6 to 14 carbon atoms, an aliphatic hydrocarbon radical having from 10 to 18 carbon atoms, a cycloaliphatic hydrocarbon radical having from 6 to 15 carbon atoms or an alkaromatic hydrocarbon radical having from 7 to 24 carbon atoms; and
 the equivalent ratio of the components (a) and (b) is 100:0.5 to 100:20.

2. A process as claimed in claim 1 wherein component (b) of the binder comprises a sulfonic acid corresponding to the general formula wherein R represents an alkyl-substituted phenyl radical having a total of from 9 to 20 carbon atoms and n represents 1.

3. A process as claimed in claims 1 or 2 wherein component (a) of the binder comprises a phosgenation product of an undistilled bottom fraction of the type formed during the removal of from 25 to 90% by weight of 2,2'-, 2,4'- and/or 4,4'-diamino-diphenylmethane from an aniline/formaldehyde condensate, or is an undistilled bottom fraction of the type obtained during the removal of from 25 to 90% by weight of 2,2'-, 2,4'- and/or 4,4'-diisocyanato-diphenylmethane from the crude phosgenation product of an aniline/formaldehyde condensate, wherein component (A) contains from 35 to 70% by weight of diisocyanato-diphenylmethanes of which from 1 to 8% by weight are 2,4'-diisocyanato-diphenylmethane and from 0 to 2% by weight are 2,2'-diisocyanato-diphenylmethane, component (A) having a viscosity of from 50 to 600 mPas at 25° C. and an NCO content of from 28 to 32% by weight.

4. A process as claimed in claims 1 or 2 wherein component (a) of the binder comprises a polyisocyanate which is obtained by distilling from 45 to 90% by weight of 4,4'-diphenylmethane diisocyanate from a crude diphenylmethane diisocyanate, said crude diphenylmethane having a content of more than 85% by weight of pure diphenylmethane diisocyanate as bottom fraction, or which is produced by phosgenation of an undistilled bottom fraction of the type produced during distillation of from 45 to 90% by weight of 4,4'-diaminodiphenylmethane from crude diamino-diphenylmethane, said crude diamino-diphenylmethane having a content of more than 85% by weight of pure diaminodiphenylmethane.

5. A process as claimed in claims 1 or 2 wherein component (a) of the binder comprises a polyisocyanate which is obtained by distilling from 25 to 80% by weight of 2,4'- and optionally 4,4'-diisocyanato-diphenylmethane from crude diphenylmethane diisocyanate, said crude diphenylmethane diisocyanate having a content of diisocyanato-diphenylmethane isomers of from 60 to 90% by weight, said diisocyanato-diphenylmethane isomers containing from 20 to 60% by weight of 2,4'-isomers as bottom fraction, or which is produced by phosgenation of the undistilled bottom fraction of the type produced during distillation of from 25 to 80% by weight of 2,4'- and optionally 4,4'-diamino-diphenylmethane from crude diaminodiphenylmethane, said crude diamino-diphenylmethane having a content of from 60 to 90% by weight of pure diamino-diphenylmethane, said pure diaminodiphenylmethane containing from 20 to 60% by weight of 2,4'-diamino-diphenylmethane.

6. A process as claimed in claim 1 wherein the polyisocyanate component and the sulfonic acid component of the binder are premixed and the organic and/or inorganic material is treated with the resulting mixture.

7. In a process for the preparation of particle board wherein particles of material capable of being compacted are contacted with a polyisocyanate and the treated particles are subsequently formed into boards by the application of heat and pressure, the improvement which comprises imparting self-releasing properties to said particle board by contacting said particles, in addition to the treatment with said polyisocyanate, with from 0.5 to 20 parts, per 100 parts by weight of said polyisocyanate, of a sulfur-containing compound corresponding to the formula R—$SO_3H$, wherein, in the formula R represents alkyl having from 10 to 18 carbon atoms, aryl containing from 6 to 14 carbon atoms, and aryl substituted by at least one alkyl containing from 7 to 24 carbon atoms.

8. The process of claim 7, wherein said compound is decyl sulfonic acid.

9. The process of claim 7, wherein said compound is dodecyl benzene sulfonic acid.

10. The process of claim 7, wherein said compound is undecyl benzene sulfonic acid.

11. The process of claim 7, wherein the particles employed in the preparation of said particle board are wood chips.

12. The process of claim 7, wherein said particles are contacted separately with said polyisocyanate and said sulfur-containing compound.

* * * * *